United States Patent
Bian et al.

(10) Patent No.: US 10,795,083 B1
(45) Date of Patent: Oct. 6, 2020

(54) HETEROGENEOUS DIRECTIONAL COUPLERS FOR PHOTONICS CHIPS

(71) Applicant: GLOBALFOUNDRIES Inc., Grand Cayman (KY)

(72) Inventors: Yusheng Bian, Ballston Lake, NY (US); Ajey Poovannummoottil Jacob, Watervliet, NY (US); Steven M. Shank, Jericho, VT (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 0 days.

(21) Appl. No.: 16/426,551

(22) Filed: May 30, 2019

(51) Int. Cl.
| | |
|---|---|
| *G02B 6/125* | (2006.01) |
| *G02B 6/122* | (2006.01) |
| *G02B 6/13* | (2006.01) |
| *G02B 6/12* | (2006.01) |

(52) U.S. Cl.
CPC ........... *G02B 6/125* (2013.01); *G02B 6/1228* (2013.01); *G02B 6/13* (2013.01); *G02B 2006/12061* (2013.01); *G02B 2006/12097* (2013.01); *G02B 2006/12147* (2013.01)

(58) Field of Classification Search
None
See application file for complete search history.

(56) References Cited

U.S. PATENT DOCUMENTS

| | | |
|---|---|---|
| 2,748,350 A | 5/1956 | Miller |
| 2,794,959 A | 6/1957 | Fox |
| 4,717,228 A | 1/1988 | Thylen |
| 8,891,913 B1 | 11/2014 | Roth et al. |
| 8,948,555 B1 | 2/2015 | Roth et al. |
| 2004/0081389 A1 | 4/2004 | Soda et al. |
| 2018/0331491 A1* | 11/2018 | Tsuji .................... H01S 5/4068 |

OTHER PUBLICATIONS

Lu et al., "Broadband silicon photonic directional coupler using asymmetric-waveguide based phase control", Optics Express vol. 23, Issue 3, pp. 3795-3808 (2015).

* cited by examiner

*Primary Examiner* — Jerry Rahll
(74) *Attorney, Agent, or Firm* — Thompson Hine LLP; Francois Pagette

(57) ABSTRACT

Structures for a directional coupler and methods of fabricating a structure for a directional coupler. A first section of a first waveguide core is laterally spaced from a second section of a second waveguide core. A coupling element is arranged either over or under the first section of the first waveguide core and the second section of the second waveguide core. The first and second waveguide cores are comprised of a material having a first refractive index, and the first coupling element is comprised of a material having a second refractive index that is different from the first refractive index. The first coupling element is surrounded by a side surface that overlaps with the first section of the first waveguide core and the second section of the second waveguide core.

20 Claims, 6 Drawing Sheets

US 10,795,083 B1

HETEROGENEOUS DIRECTIONAL COUPLERS FOR PHOTONICS CHIPS

BACKGROUND

The present invention relates to photonics chips and, more specifically, to structures for a directional coupler and methods of fabricating a structure for a directional coupler.

Photonics chips are used in many applications and systems including, but not limited to, data communication systems and data computation systems. A photonics chip integrates optical components, such as waveguides, optical switches, directional couplers, and bends, and electronic components, such as field-effect transistors, into a unified platform. Among other factors, layout area, cost, and operational overhead may be reduced by the integration of both types of components on the same chip.

Directional couplers are employed on a photonics chip to couple propagating optical signals from the core in one waveguide to the core of another waveguide, or to split the propagating optical signals between the waveguide cores. A directional coupler includes sections of the waveguides that are routed with a reduced lateral spacing that is selected to promote coupling over a given coupling length. Conventional directional couplers possess a large footprint because a large coupling length is needed to compensate for a lack of coupling strength between the waveguide cores.

Improved structures for a directional coupler and methods of fabricating a structure for a directional coupler are needed.

SUMMARY

In an embodiment of the invention, a structure for a directional coupler is provided. The structure includes a first waveguide core having a first section and a second waveguide core having a second section. The second section of the second waveguide core is laterally spaced from the first waveguide core. The structure further includes a coupling element arranged either over or under the first section of the first waveguide core and the second section of the second waveguide core. The first and second waveguide cores are comprised of a material having a first refractive index, and the first coupling element is comprised of a material having a second refractive index that is different from the first refractive index. The first coupling element is surrounded by a side surface that overlaps with the first section of the first waveguide core and the second section of the second waveguide core.

In an embodiment of the invention, a method of forming a structure for a directional coupler. The method includes forming a first waveguide core having a first section and a second waveguide core having a second section that is laterally spaced from the first section of the first waveguide core. The method further includes forming one or more coupling elements arranged either over or under the first section of the first waveguide core and the second section of the second waveguide core. The first waveguide core and the second waveguide core are comprised of a material having a first refractive index, and the one or more coupling elements are comprised of a material having a second refractive index that is different from the first refractive index. Each coupling element is surrounded by a side surface that overlaps with the first section of the first waveguide core and the second section of the second waveguide core.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
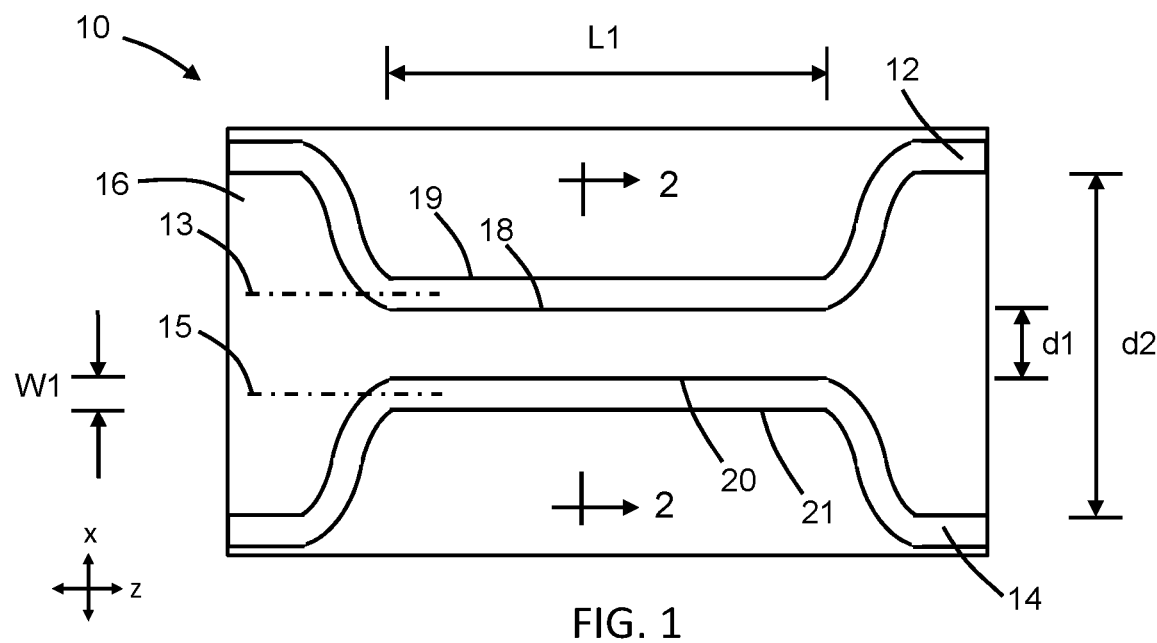
FIG. 1 is a diagrammatic top view of a structure at an initial fabrication stage of a processing method in accordance with embodiments of the invention.
Figure 2:
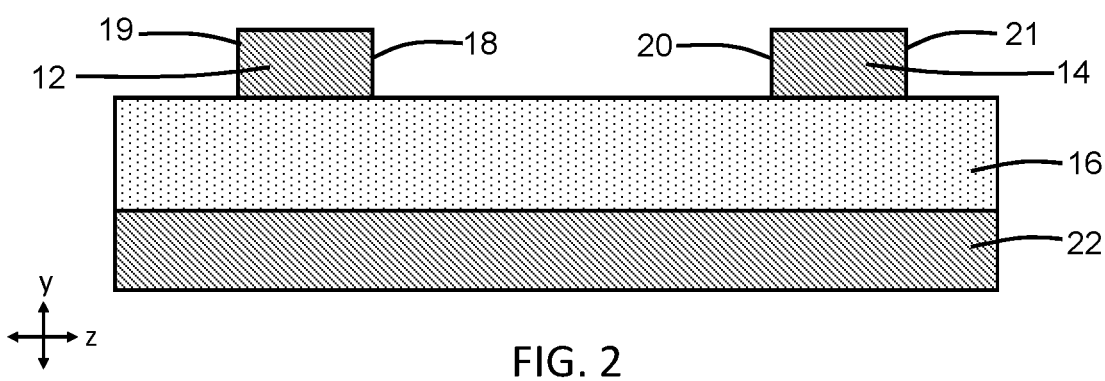
FIG. 2 is a cross-sectional view of the structure taken generally along line 2-2 in FIG. 1.

With reference to FIGS. 1, 2 and in accordance with embodiments of the invention, a structure 10 for a directional coupler includes a section of a waveguide core 12 and a section of a waveguide core 14 that are both arranged over a dielectric layer 16. The section of the waveguide core 12 extends symmetrically along a longitudinal axis 13, and the section of the waveguide core 14 extends symmetrically along a longitudinal axis 15. The longitudinal axis 13 of the section of the waveguide core 14 may be arranged parallel to the longitudinal axis 15 of the section of the waveguide core 12.

The sections of waveguide cores 12, 14 may have a width, W1, and a length, L1, transverse to the width, W1. Lengths may be measured in a given direction (e.g., the z-direction) in a plane, and widths may be measured in an orthogonal direction (e.g., the x-direction) in the plane. The waveguide core 12 includes sidewalls in the form of side surfaces 18 and 19 that project in a vertical direction from the dielectric layer 16, and the waveguide core 14 includes sidewalls in the form of side surfaces 20 and 21 that project in a vertical direction from the dielectric layer 16. The inner surface 18 of the section of the waveguide core 12 participating in the structure 10 is arranged adjacent to the inner surface 20 of the section of the waveguide core 14 participating in the structure 10. The widths of the sections of the waveguide cores 12, 14 may be constant over their respective lengths.

The section of the waveguide core 12 participating in the structure 10 is laterally spaced from the section of the waveguide core 14 participating in the structure 10 by a smaller distance than the spacing separating the sections of the waveguide cores 12, 14 providing input ports and output ports to the structure 10. In that regard, the side surface 18 of the section of the waveguide core 12 may be arranged adjacent to, and aligned parallel with, the side surface 20 of the section of the waveguide core 14, and the inner side surfaces 18 and 20 may be separated over a given coupling length of the structure 10 by a gap dimensioned with a perpendicular distance, d1. Outside of the site of the structure 10, the inner side surface 18 of the waveguide core 12 and the inner side surface 20 of the waveguide core 14 may be separated by a gap dimensioned with a perpendicular distance, d2, that is greater than the perpendicular distance, d1. The coupling between the waveguide cores 12, 14 is negligible outside of the site of the structure 10 due to the larger perpendicular distance between the inner side surfaces 18, 20. The perpendicular distance between the side surface 18 and the side surface 20 is the distance from one to the other, measured along a line that is perpendicular to one or both. The waveguide cores 12, 14 may each include a set of bends that provide the change in separation between the side surface 18 of the waveguide core 12 and the side surface 20 of the waveguide core 14.

The waveguide cores 12, 14 may be composed of a single-crystal semiconductor material, such as single-crystal silicon and, in particular, single-crystal silicon originating from a device layer of a silicon-on-insulator (SOI) wafer. The silicon-on-insulator wafer further includes a buried insulator layer composed of a dielectric material, such as silicon dioxide, that provides the dielectric layer 16 and a substrate 22 composed of a single-crystal semiconductor material, such as single-crystal silicon, under the buried insulator layer. The waveguide cores 12, 14 may be simultaneously patterned from a layer of single-crystal semiconductor material (e.g., the device layer of the SOI wafer) by lithography and etching processes during front-end-of-line processing. The waveguide cores 12, 14 may be rib waveguides, as shown, for which the layer of single-crystal semiconductor material is fully etched to expose the dielectric layer 16 about the waveguide cores 12, 14. Alternatively, the layer of single-crystal semiconductor material may only be partially etched to define the waveguide cores 12, 14 as ridge waveguides that are connected at their respective bases by a thin residual layer.

Figure 3:
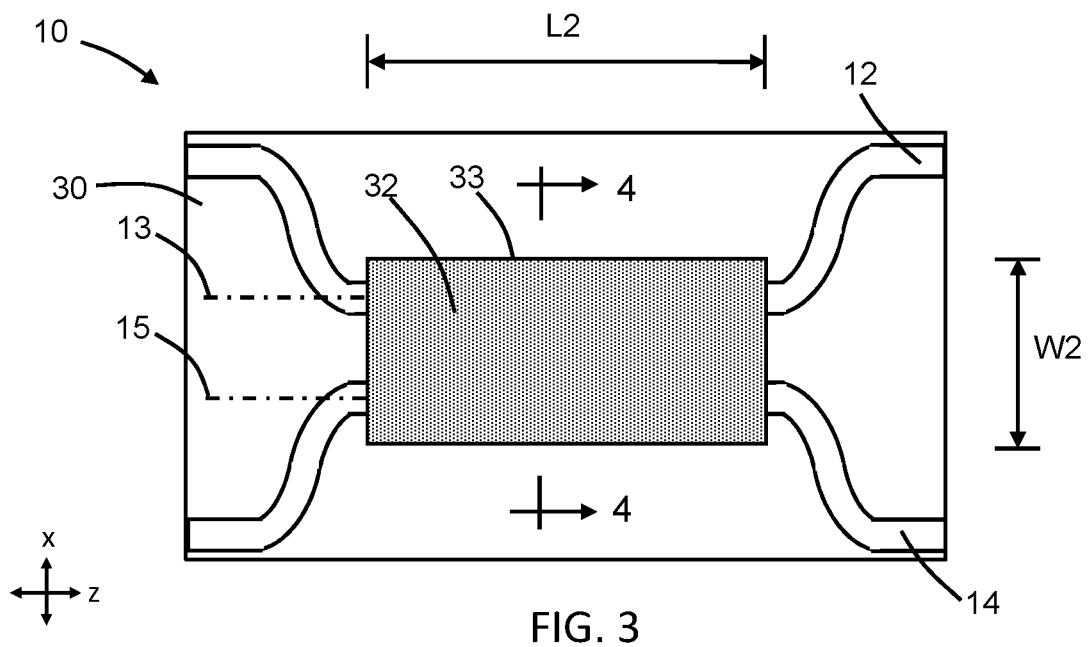
FIG. 3 is a top view of the structure at a fabrication stage subsequent to FIG. 1.

With reference to FIG. 3 in which like reference numerals refer to like features in FIG. 2 and at a subsequent fabrication stage, dielectric layers 24, 26, 28, 30 composed of respective dielectric materials are sequentially formed in a layer stack over the waveguide cores 12, 14. In the layer stack, the dielectric layer 24 is arranged over the dielectric layer 16, the dielectric layer 26 is arranged over the dielectric layer 24, the dielectric layer 28 is arranged over the dielectric layer 26, and the dielectric layer 30 is arranged over the dielectric layer 28. The waveguide cores 12, 14 are embedded or buried in the dielectric material of the dielectric layer 24, which acts as lateral cladding. The dielectric layer 24 may be composed of a dielectric material, such as silicon dioxide, deposited by chemical vapor deposition and planarized with, for example, chemical mechanical polishing (CMP) to remove topography. The dielectric layer 26 may be composed of dielectric material, such as silicon dioxide, deposited by chemical vapor deposition or atomic layer deposition over the dielectric layer 24. The dielectric layer 28 may be composed of dielectric material, such as silicon nitride, deposited by chemical vapor deposition or atomic layer deposition over the dielectric layer 26. The dielectric layer 30 may be composed of dielectric material, such as silicon dioxide, deposited by chemical vapor deposition or atomic layer deposition over the dielectric layer 28.

A coupling element 32 is arranged over the dielectric layer 30, which provides a planar surface for its deposition and patterning. The coupling element 32 may be formed from a layer composed of a material, such as a dielectric material and, in particular, silicon nitride, that is deposited with chemical vapor deposition or atomic layer deposition on the dielectric layer 30 and then patterned with lithography and etching processes. The etching process may be selected to stop on the dielectric material of the dielectric layer 30. In an embodiment, the coupling element 32 may be arranged in direct contact with the dielectric layer 30. The material constituting the coupling element 32 may have a refractive index that differs from the refractive index of the material constituting the waveguide cores 12, 14. The coupling element 32 is a passive structure that lacks any type of external connection, such as an electrical connection. The dielectric layers 26, 28, 30 are arranged in a vertical direction between the coupling element 32 and the waveguide cores 12, 14.

The coupling element 32 is patterned to have a closed shape with a given set of dimensions and an outer boundary established by the etch mask provided by the lithography process. The closed shape of the coupling element 32 may be bounded and surrounded by a side surface 33, and the side surface 33 may have a length, L2, and a width, W2. The side surface 33 may define an outer boundary of a solid and unbroken slab of patterned material representing the coupling element 32. In an embodiment, the side surface 33 may be rectangular. The extent of the overlap of the coupling element 32 along the longitudinal axes 13, 15 with the waveguide cores 12, 14 is commensurate with the length, L2, which may define all or part of the coupling length associated with the structure 10. The length of the coupling element 32 may be less than the length of the sections of the waveguide cores 12, 14 associated with the structure 10.

The coupling element 32, and the side surface 33 in particular, laterally overlaps (e.g., in the x-direction and in the z-direction) with the section of the waveguide core 12 and the section of the waveguide core 14. The width, W3, of the coupling element 32 may be greater than a sum of the individual widths of the waveguide cores 12, 14 and the perpendicular distance between the inner side surfaces 18 and 20 such that the side surface 33 of the coupling element 32 extends laterally beyond the outer side surface 19 of the waveguide core 12 and the outer side surface 21 of the waveguide core 14 to provide a full overlap in the width dimension.

In an embodiment, the dielectric layer 28 and the coupling element 32 may be composed of the same dielectric material, such as silicon nitride. In an alternative embodiment, the dielectric layer 28 may be omitted from the layer stack that is arranged in the vertical direction between the coupling element 32 and the waveguide cores 12, 14.

Figure 4:
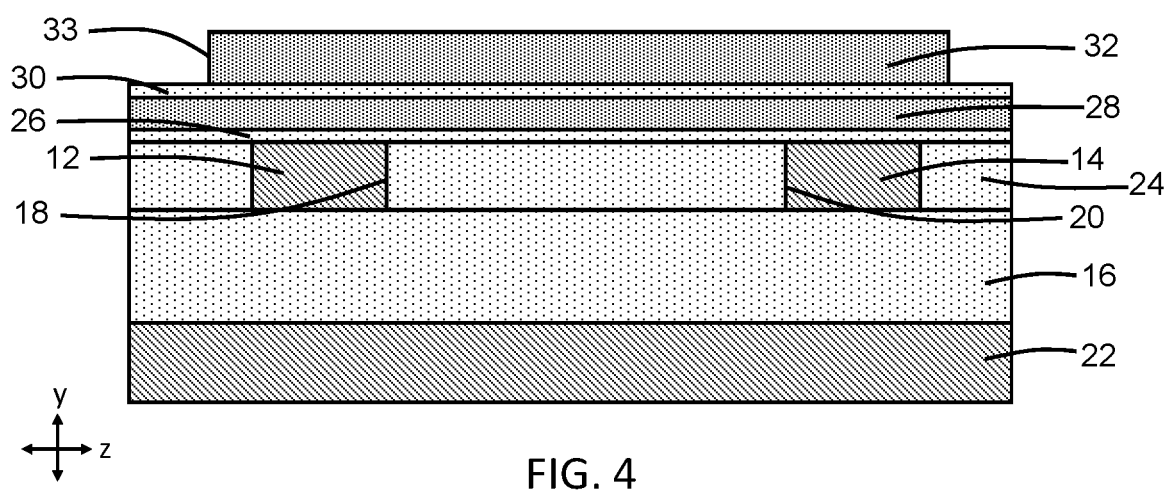
FIG. 4 is a cross-sectional view of the structure taken generally along line 4-4 in FIG. 3.
Figure 5:
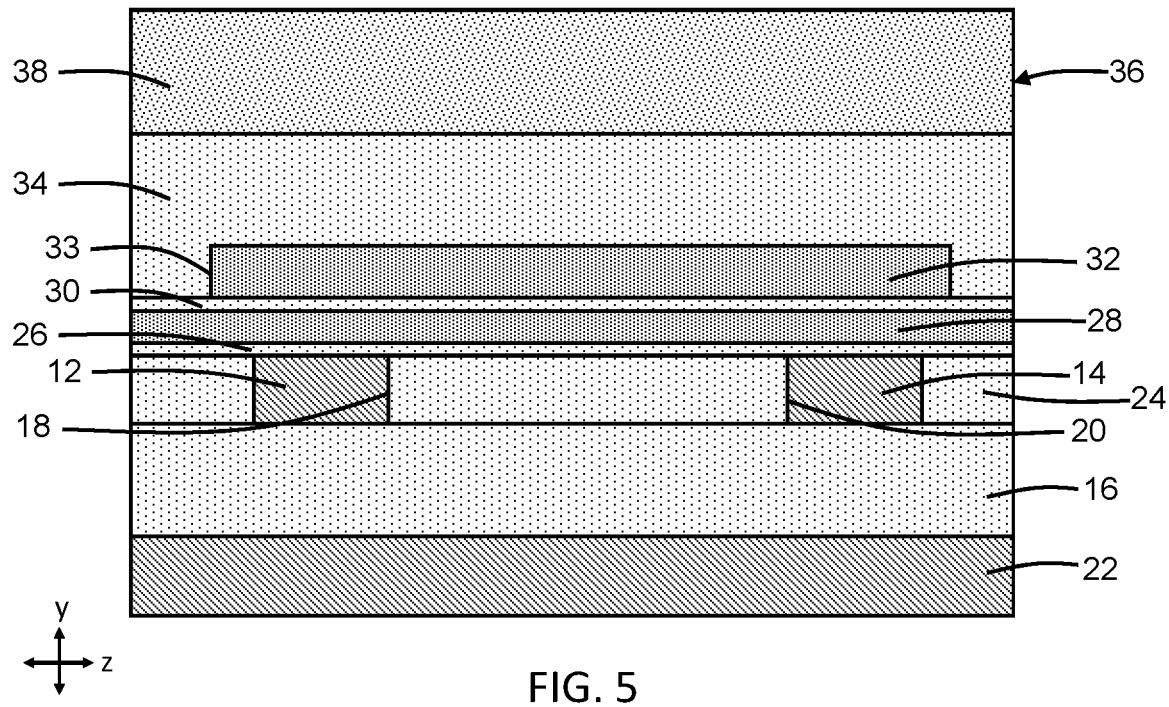
FIG. 5 is a cross-sectional view of the structure at a fabrication stage subsequent to FIG. 4.

With reference to FIG. 5 in which like reference numerals refer to like features in FIG. 4 and at a subsequent fabrication stage, a dielectric layer 34 of a contact level is formed by middle-of-line processing over the coupling element 32. The dielectric layer 34 may be composed of dielectric material, such as silicon dioxide, deposited by chemical vapor deposition using ozone and tetraethylorthosilicate (TEOS) as reactants. In the representative embodiment, the coupling element 32 is embedded in the dielectric material of the dielectric layer 34.

A back-end-of-line stack, generally indicated by reference numeral 36, is formed by back-end-of-line (BEOL) processing over the dielectric layer 34 and the structure 10. The back-end-of-line stack 36 may include one or more interlayer dielectric layers 38 composed of one or more dielectric materials, such as a carbon-doped silicon oxide. The back-end-of-line stack 36 may further include metallization composed of, for example, copper, tungsten, and/or cobalt that is arranged in the one or more interlayer dielectric layers 38. The coupling element 32 is not coupled with the metallization of the back-end-of-line stack 36 or with contacts in the dielectric layer 34 of the contact level.

Figure 6:
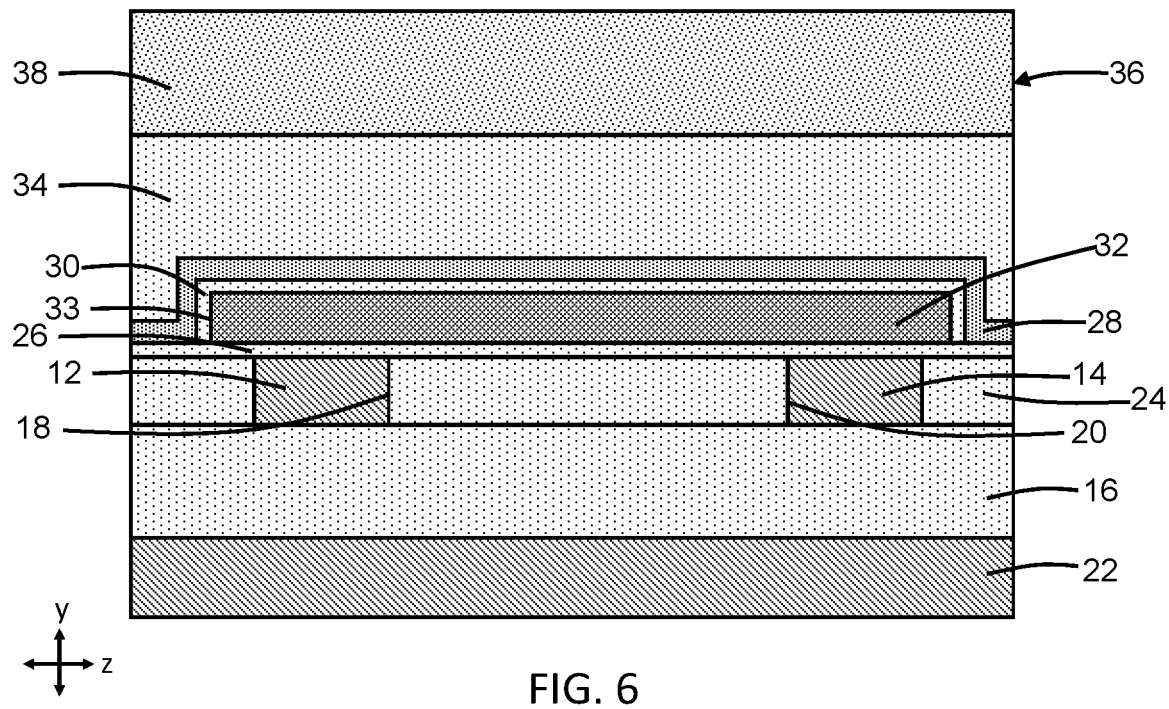
FIG. 6-8 are cross-sectional views of structures in accordance with alternative embodiments of the invention.

With reference to FIG. 6 and in accordance with alternative embodiments of the invention, the coupling element 32 may be composed of a material that is not a dielectric material. In an embodiment, the coupling element 32 may be formed from a layer composed of a polycrystalline semiconductor material, such as polycrystalline silicon (i.e., polysilicon), that is deposited on the dielectric layer 26 and patterned with lithography and etching processes. The etching process may be selected to stop on the dielectric material of the dielectric layer 26. The dielectric layers 28 and 30 are formed, in a reverse order, after the coupling element 32 is patterned. For that reason, the dielectric layers 28 and 30 conformally overlap with the side surface 33 and the top surface of the coupling element 32, and are arranged between the coupling element 32 and the dielectric layer 34.

Figure 7:
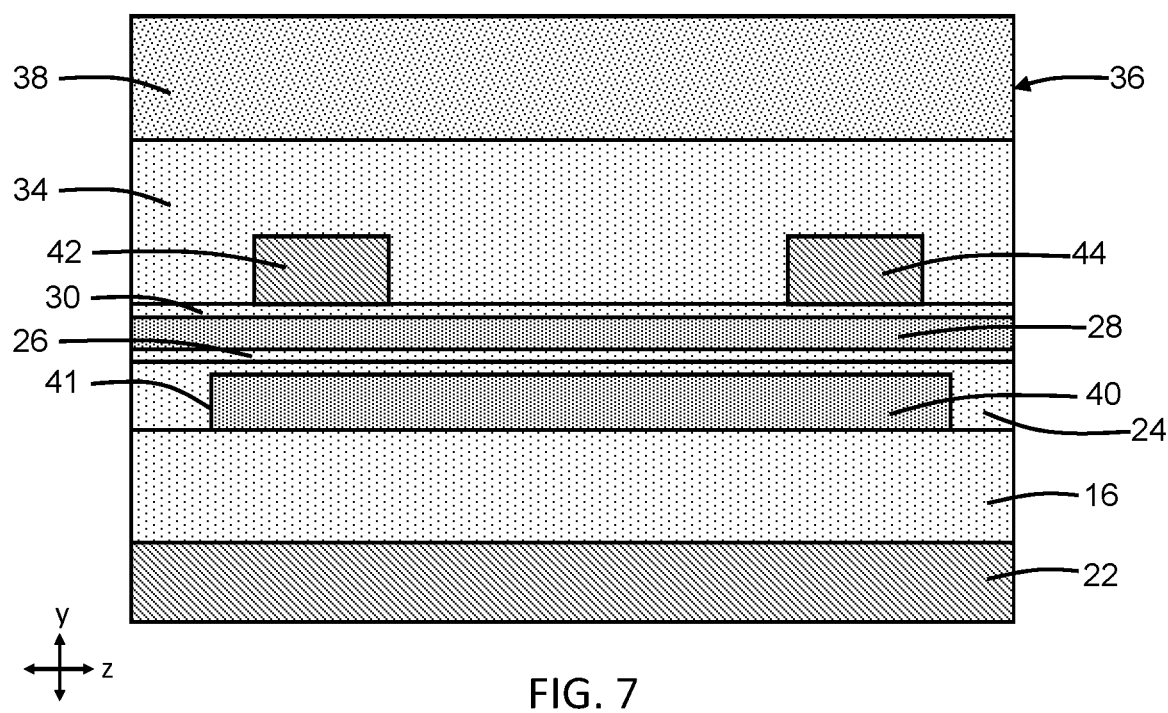

With reference to FIG. 7 and in accordance with alternative embodiments of the invention, the structure 10 may include sections of waveguide cores 42, 44 and a coupling element 40 that is arranged under the sections of the waveguide cores 42, 44. The waveguide cores 42, 44 are formed after the coupling element 40 is formed. The waveguide cores 42, 44, which are similar to waveguide cores 12, 14, are composed of a dielectric material, such as silicon nitride, that is deposited on the dielectric layer 30 and patterned with lithography and etching processes. The coupling element 40, which is similar to coupling element 32, is composed of single-crystal semiconductor material, such as the single-crystal semiconductor material of the device layer of an SOI wafer, that is patterned with lithography and etching processes. The coupling element 40 has a side surface 41 that is dimensioned and placed relative to the sections of the waveguide cores 42, 44 similar to the dimensions and placement of the side surface 33 of the coupling element 32 relative to the sections of the waveguide cores 12, 14.

In an alternative embodiment, the dielectric layer 28 may be omitted from the dielectric layer stack arranged in the vertical direction between the coupling element 40 and the waveguide cores 42, 44. In the representative embodiment, the waveguide cores 42, 44 may be rib waveguides, as shown, for which the deposited dielectric layer is fully etched to expose the dielectric layer 30 about the waveguide cores 42, 44. In an alternative embodiment, the deposited dielectric layer may only be partially etched to define the waveguide cores 42, 44 as ridge waveguides connected by a thin residual layer of the dielectric material.

In the representative embodiment, the layer of single-crystal semiconductor material may be fully etched to expose the dielectric layer 16 about the coupling element 40. In an alternative embodiment, the layer of single-crystal semiconductor material may only be partially etched to define a thin residual layer that surrounds the coupling element 40 and covers the dielectric layer 16.

Figure 8:
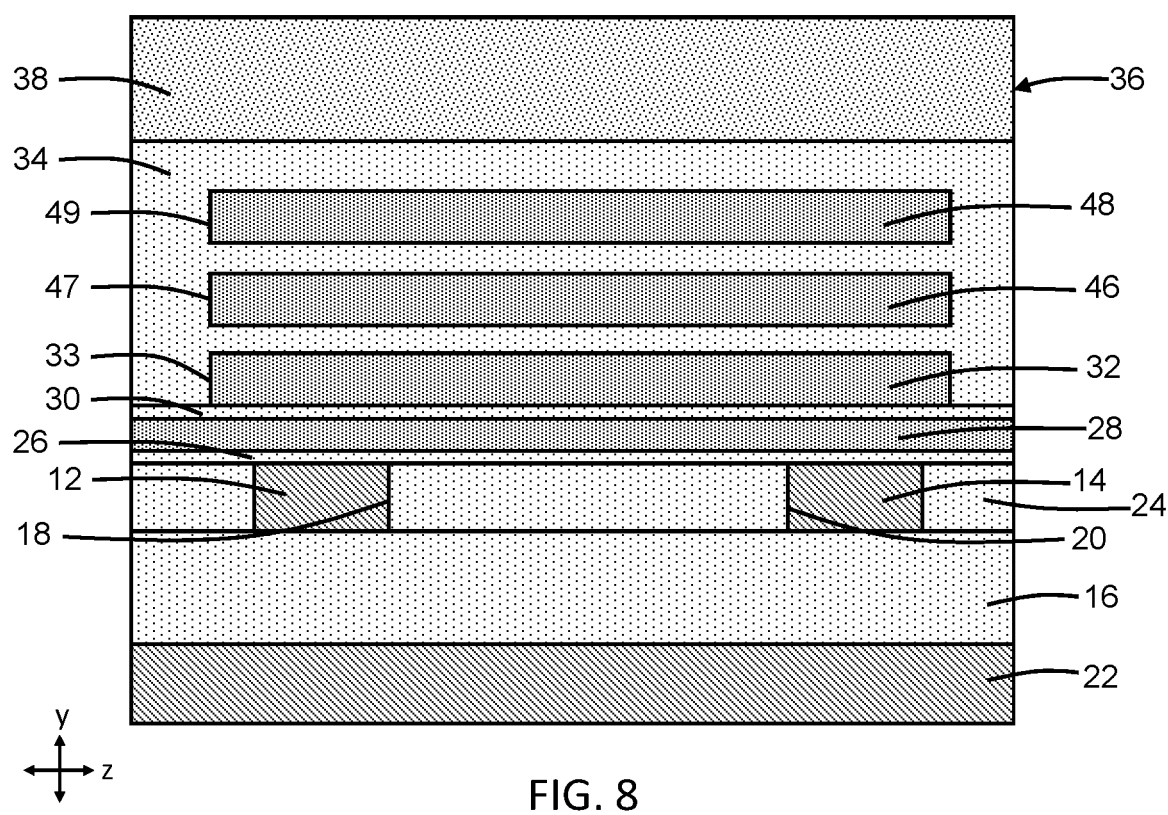

With reference to FIG. 8 and in accordance with alternative embodiments of the invention, the structure 10 may be modified to add one or more coupling elements 46, 48 that are stacked in a vertical direction with the coupling element 32. Each of the added coupling elements 46, 48 is arranged in a stack over the coupling element 32. After forming a section of the dielectric layer 34 over the coupling element 32, the coupling element 46 may be formed from a layer composed of a dielectric material, such as silicon nitride, that is deposited and patterned with lithography and etching processes. After forming another section of the dielectric layer 34 over the coupling element 46, the coupling element 48 may be formed from a layer composed of a dielectric material, such as silicon nitride, that is deposited and patterned with lithography and etching processes. Another section of the dielectric material of the dielectric layer 34 may be formed over the coupling element 48.

The coupling elements 46 and 48 may be characterized by a shape with respective side surfaces 47, 49 with dimensions that are equal to the dimensions of the side surface 33 of the coupling element 32. In addition, each of the coupling elements 46 and 48 may be laterally positioned directly over the coupling element 32 such that the overlap is exact with the respective side surfaces 47, 49 aligned in a vertical direction with the side surface 33 of the coupling element 32.

In an alternative embodiment, the dielectric layer 28 may be omitted from the dielectric layer stack arranged in the vertical direction between the coupling elements 32, 46, 48 and the waveguide cores 12, 14.

Figure 9:
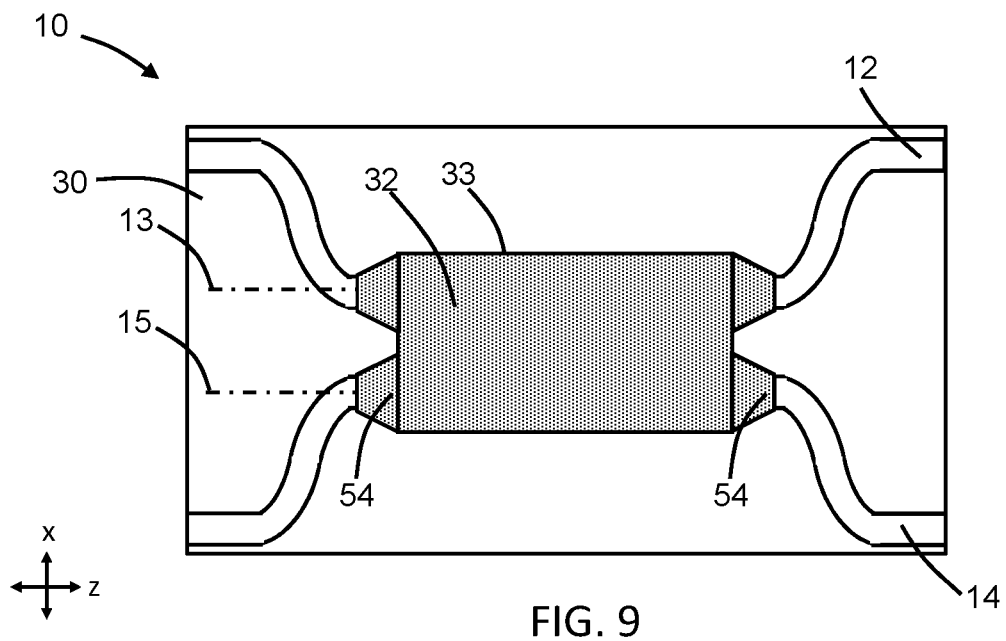
FIGS. 9 and 10 are top views of structures in accordance with alternative embodiments of the invention.
Figure 10:
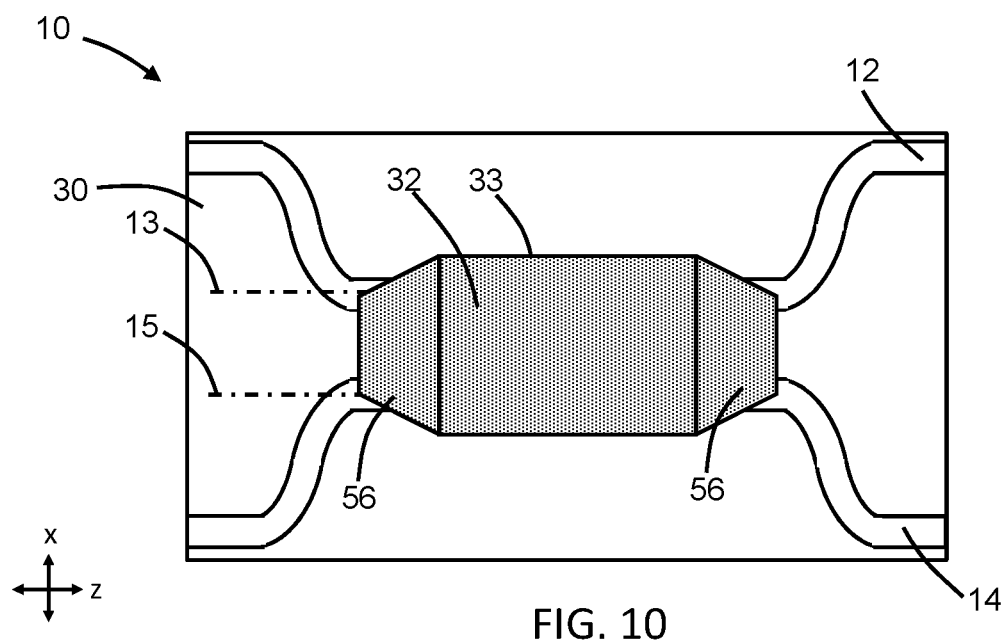

With reference to FIGS. 9, 10 and in accordance with alternative embodiments of the invention, the structure 10 may be modified to add one or more tapers to the coupling element 32. The tapers may enhance the coupling from the sections of the waveguide cores 12, 14 participating in the structure 10 to the coupling element 32 at the input port to the structure 10 and from the coupling element 32 to the sections of the waveguide cores 12, 14 participating in the structure 10 at the output port from the structure 10.

For example and as shown in FIG. 9, a taper 54 may be added over each of the sections of the waveguide cores 12, 14 in the structure 10 as appendages projecting from the side surface 33 of the coupling element 32 proximate to the input and output ports. The width of the tapers 54 may decrease with increasing distance from the side surface 33. As another example and as shown in FIG. 10, a taper 56 may be added over both sections of the waveguide cores 12, 14 in the structure 10 proximate to the input port and the output port as appendages projecting from the side surface 33 of the coupling element 32. The width of the tapers 56 may decrease with increasing distance from the side surface 33.

The structure 10, in any of its embodiments described herein, may be integrated into a photonics chip that includes electronic components and additional optical components formed on the same chip. For example, the electronic components may include field-effect transistors that are fabricated by CMOS front-end-of-line (FEOL) processing.

The one or more coupling elements of the directional coupler, in any of its embodiments described herein, may enhance the coupling between optical signals and, in particular, the transverse electric (TE) modes of optical signals propagating in the associated sections of the waveguide cores. For example, the coupling may be enhanced for transferring all or part of optical signals propagating in one of the waveguide cores to the other of the waveguide cores. The enhanced coupling decreases the coupling length over which the sections of the waveguide cores are arranged proximate to each other, which promotes a reduction in footprint and size relative to conventional directional couplers. The one or more coupling elements effectively act as a bridge that increases the strength of the interaction between TE modes in the sections of the waveguide cores in the directional coupler. The addition of the coupling elements to the waveguide cores provides a heterogeneous structure for the directional coupler.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or "in direct contact with" another feature if intervening features are absent. A feature may be "indirectly on" or "in indirect contact with" another feature if at least one intervening feature is present.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure for a directional coupler, the structure comprising:
   a first waveguide core having a first section;
   a second waveguide core having a second section, the second section of the second waveguide core laterally spaced from the first section of the first waveguide core; and
   a first coupling element arranged over the first section of the first waveguide core and the second section of the second waveguide core,
   wherein the first waveguide core and the second waveguide core are comprised of a first material having a first refractive index, the first coupling element is comprised of a second material having a second refractive index that is different from the first refractive index, the first coupling element is surrounded by a side surface that overlaps with the first section of the first waveguide core and the second section of the second waveguide core, the first material of the first waveguide core and the second waveguide core is a single-crystal semiconductor material, and the second material of the first coupling element is silicon nitride.

2. The structure of claim 1 wherein the first section of the first waveguide core is arranged along a first longitudinal axis, the second section of the second waveguide core is arranged along a second longitudinal axis that is substantially parallel to the first longitudinal axis, and the first coupling element is arranged along the first longitudinal axis fully over the first waveguide core and along the second longitudinal axis fully over the second waveguide core.

3. The structure of claim 2 wherein the first section of the first waveguide core and the second section of the second waveguide core have a first length, and the first coupling element has a second length that is less than the first length.

4. The structure of claim 1 wherein the first section of the first waveguide core has a sidewall, the second section of the second waveguide core includes a sidewall that is laterally spaced from the sidewall of the first waveguide core by a perpendicular distance, the first section of the first waveguide core and the second section of the second waveguide core have a first width, and the first coupling element has a sidewall with a second width that is greater than a sum of the first width of the first section of the first waveguide core, the first width of the second section of the second waveguide core, and the perpendicular distance.

5. The structure of claim 1 further comprising:
   a second coupling element arranged over the first coupling element, the second coupling element surrounded by a side surface that overlaps with the first section of the first waveguide core and the second section of the second waveguide core.

6. The structure of claim 5 wherein the second coupling element is comprised of the second material.

7. The structure of claim 5 wherein the first section of the first waveguide core is arranged along a first longitudinal axis, the second section of the second waveguide core is arranged along a second longitudinal axis that is substantially parallel to the first longitudinal axis, and the first coupling element and the second coupling element are arranged along the first longitudinal axis fully over the first waveguide core and along the second longitudinal axis fully over the second waveguide core.

8. The structure of claim 7 wherein the first section of the first waveguide core and the second section of the second waveguide core have a first length, and the first coupling element and the second coupling element have a second length that is less than the first length.

9. The structure of claim 5 wherein the first section of the first waveguide core has a sidewall, the second section of the second waveguide core includes a sidewall that is laterally spaced from the sidewall of the first waveguide core by a perpendicular distance, the first section of the first waveguide core and the second section of the second waveguide core have a first width, and the first coupling element and the second coupling element each have a sidewall with a second width that is greater than a sum of the first width of the first section of the first waveguide core, the first width of the second section of the second waveguide core, and the perpendicular distance.

10. The structure of claim 1 wherein the first coupling element includes a taper arranged over a portion of the first section of the first waveguide core.

11. The structure of claim 1 wherein the first coupling element includes a taper arranged over a portion of the first section of the first waveguide core and over a portion of the second section of the second waveguide core.

12. The structure of claim 1 further comprising:
one or more second dielectric layers arranged in a vertical direction between the first coupling element and the first waveguide core and between the first coupling element and the second waveguide core.

13. A structure for a directional coupler, the structure comprising:
a first waveguide core having a first section;
a second waveguide core having a second section, the second section of the second waveguide core laterally spaced from the first section of the first waveguide core; and
a coupling element arranged over or under the first section of the first waveguide core and the second section of the second waveguide core,
wherein the first waveguide core and the second waveguide core are comprised of a first material having a first refractive index, the coupling element is comprised of a second material having a second refractive index that is different from the first refractive index, the coupling element is surrounded by a side surface that overlaps with the first section of the first waveguide core and the second section of the second waveguide core, the first section of the first waveguide core is arranged along a first longitudinal axis, the second section of the second waveguide core is arranged along a second longitudinal axis that is substantially parallel to the first longitudinal axis, the coupling element is arranged along the first longitudinal axis fully over the first waveguide core and along the second longitudinal axis fully over the second waveguide core, the first section of the first waveguide core and the second section of the second waveguide core have a first length, and the coupling element has a second length that is less than the first length.

14. The structure of claim 13 wherein the first section of the first waveguide core has a sidewall, the second section of the second waveguide core includes a sidewall that is laterally spaced from the sidewall of the first waveguide core by a perpendicular distance, the first section of the first waveguide core and the second section of the second waveguide core have a first width, and the coupling element has a sidewall with a second width that is greater than a sum of the first width of the first section of the first waveguide core, the first width of the second section of the second waveguide core, and the perpendicular distance.

15. The structure of claim 13 wherein the first material is silicon nitride.

16. The structure of claim 13 wherein the first material is single-crystal silicon.

17. The structure of claim 13 wherein the second material is a polycrystalline semiconductor material.

18. A structure for a directional coupler, the structure comprising:
a first waveguide core having a first section;
a second waveguide core having a second section, the second section of the second waveguide core laterally spaced from the first section of the first waveguide core; and
a coupling element arranged under the first section of the first waveguide core and the second section of the second waveguide core,
wherein the first waveguide core and the second waveguide core are comprised of a first material having a first refractive index, the coupling element is comprised of a second material having a second refractive index that is different from the first refractive index, the coupling element is surrounded by a side surface that overlaps with the first section of the first waveguide core and the second section of the second waveguide core, the second material of the coupling element is a single-crystal semiconductor material, and the first material of the first waveguide core and the second waveguide core is silicon nitride.

19. The structure of claim 18 wherein the first section of the first waveguide core is arranged along a first longitudinal axis, the second section of the second waveguide core is arranged along a second longitudinal axis that is substantially parallel to the first longitudinal axis, and the coupling element is arranged along the first longitudinal axis fully over the first waveguide core and along the second longitudinal axis fully over the second waveguide core.

20. The structure of claim 18 wherein the first section of the first waveguide core has a sidewall, the second section of the second waveguide core includes a sidewall that is laterally spaced from the sidewall of the first waveguide core by a perpendicular distance, the first section of the first waveguide core and the second section of the second waveguide core have a first width, and the coupling element has a sidewall with a second width that is greater than a sum of the first width of the first section of the first waveguide core, the first width of the second section of the second waveguide core, and the perpendicular distance.

* * * * *